(12) United States Patent
Moro

(10) Patent No.: US 9,060,079 B2
(45) Date of Patent: Jun. 16, 2015

(54) IMAGE FORMING APPARATUS

(71) Applicant: Konica Minolta, Inc., Tokyo (JP)

(72) Inventor: Fuminori Moro, Atsugi (JP)

(73) Assignee: KONICA MINOLTA, INC. (JP)

( * ) Notice: Subject to any disclaimer, the term of this patent is extended or adjusted under 35 U.S.C. 154(b) by 0 days.

(21) Appl. No.: 14/266,922

(22) Filed: May 1, 2014

(65) Prior Publication Data

US 2014/0333962 A1  Nov. 13, 2014

(30) Foreign Application Priority Data

May 10, 2013  (JP) ................................. 2013-100155

(51) Int. Cl.
*G06K 9/03* (2006.01)
*H04N 1/00* (2006.01)
*B41J 29/393* (2006.01)
*G06K 15/00* (2006.01)

(52) U.S. Cl.
CPC ........... *H04N 1/00082* (2013.01); *B41J 29/393* (2013.01); *H04N 1/00015* (2013.01); *H04N 1/00031* (2013.01); *H04N 1/00047* (2013.01); *H04N 1/0005* (2013.01); *H04N 1/00063* (2013.01); *H04N 2201/0082* (2013.01)

(58) Field of Classification Search
CPC .......... G03G 15/5058; G03G 15/5056; G03G 15/0832; G03G 15/0836; G03G 2215/00569; G03G 2215/00755; G03G 2221/1892; G03G 15/55; G03G 21/16; G06K 15/027; G06K 9/036; H04N 1/00031; H04N 1/00034; H04N 1/00045; H04N 1/00047; H04N 1/00063; H04N 1/00082; H04N 1/00538; B41J 29/393; B41J 29/3935
USPC ........ 399/8–37, 107–111; 358/501–504, 406, 358/1.13–1.18
See application file for complete search history.

(56) References Cited

U.S. PATENT DOCUMENTS

| | | | |
|---|---|---|---|
| 6,128,098 A * | 10/2000 | Kamada et al. ................ 358/1.8 |
| 2004/0008245 A1* | 1/2004 | Hirai et al. .................... 347/129 |
| 2005/0117928 A1* | 6/2005 | Hino .............................. 399/49 |
| 2007/0166064 A1* | 7/2007 | Takahashi et al. .............. 399/49 |
| 2011/0044708 A1* | 2/2011 | Kusakabe ....................... 399/49 |

FOREIGN PATENT DOCUMENTS

JP  2011-69917 A  4/2011

\* cited by examiner

*Primary Examiner* — Chad Dickerson
(74) *Attorney, Agent, or Firm* — Cantor Colburn LLP

(57) ABSTRACT

An image forming apparatus that forms an image on a sheet includes a determination processing section. The determination processing section determines whether or not the quality of the image, which is formed on the sheet after detaching and attaching a component or a unit, has been improved, at least using read data of an image, which is formed on a sheet before detaching and attaching the component or unit of the image forming apparatus, the read data being read by a read sensor and read data of an image, which is formed on a sheet after detaching and attaching the component or unit of the image forming apparatus, the read data being read by the read sensor.

7 Claims, 5 Drawing Sheets

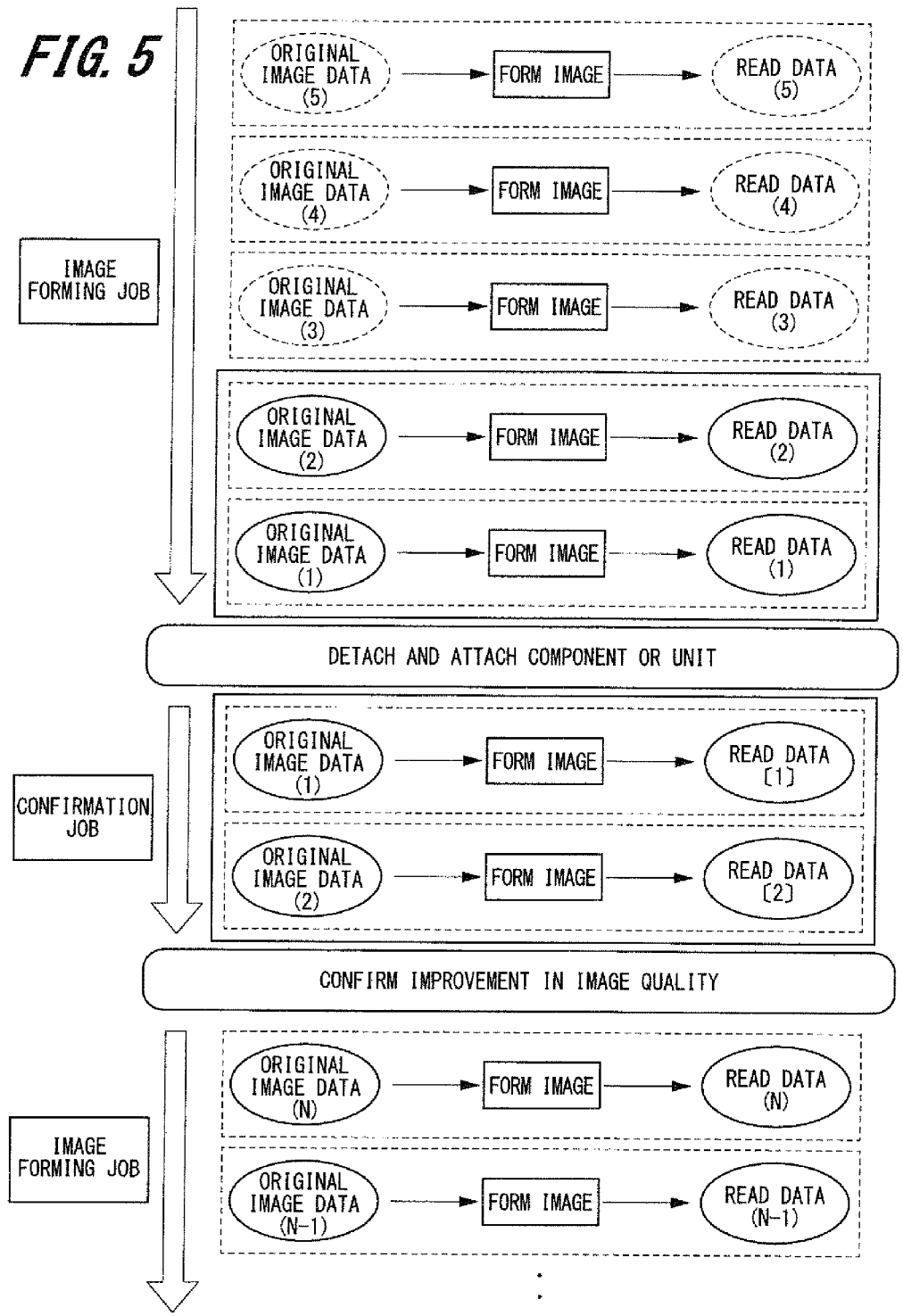

IMAGE FORMING APPARATUS

CROSS REFERENCES TO RELATED APPLICATIONS

The present invention contains subject matter related to Japanese Patent Application, JP 2013-100155, filed in the Japanese Patent Office on May 10, 2013, the entire contents of which is being incorporated herein by reference.

BACKGROUND OF THE INVENTION

1. Field of the Invention

The present invention relates to an image forming apparatus whose component or unit can be appropriately replaced or repaired.

2. Description of the Related Art

Conventionally, when a failure occurs in an image formed by an image forming apparatus, a component or a unit involved in image formation is replaced or repaired.

Japanese Patent Laid-Open No. 2011-69917 (Patent Literature 1) discloses a technique for enabling, when a repair person or a user performs a replacement work, the replacement work of a renewal component to be correctly and surely performed. In the technique disclosed in Patent Literature 1, when a renewal component of the image forming apparatus is replaced, input of the necessity of test printing is requested to a user through a screen. If an instruction to perform the test printing is input, the test printing is performed, thereby making the user confirm whether or not there is a failure in an output image or in the state of the image forming apparatus and making the user clear a counter for counting the number of times of use (number of times of printing) of the renewal component. Note that the technique disclosed in Patent Literature 1 is intended to prevent a user from erroneously reusing an old component and to prevent a user from forgetting to clear the counter.

SUMMARY OF THE INVENTION

However, in replacing a component, input of necessary information is entrusted to a user.

Moreover, when replacement of a component is recognized, the input of the necessity of test printing and the determination of whether or not there is a failure in an image output by test printing or in the state of a composite machine are entrusted to a user. Therefore, whether or not appropriate replacement is performed depends on the will and ability of a user.

Furthermore, because a user determines, based on an image output by test printing, whether or not the failure has been dissolved, there is no choice but to rely on the sensuous judgment of the user.

Therefore, even when a repair person responds to, for example, the case where a failure occurs in an image, a component or a unit is sometimes wastefully replaced.

From the above-described circumstance, there is a need for an approach of preventing a repair person or a user from wastefully replacing or repairing a component or a unit.

Means for Solving the Invention

An image forming apparatus according to an aspect of the present invention, which forms an image on a sheet, includes an image forming section, a read sensor, a detection section, a storage section, a determination section, and an output section.

The image forming section forms an image.

The read sensor reads an image formed on a sheet and outputs the read data. The detection section detects the fact that a component or a unit constituting the image forming apparatus has been detached and attached.

The storage section stores; read data read by the read sensor before the detection section detects detachment and attachment of the component or unit and original image data of the read data: and read data read by the read sensor after the detection section detects detachment and attachment of the component or unit and original image data of the read data.

The determination section determines whether or not quality of the image, which is formed on a sheet after detaching and attaching the component or unit, has been improved, using the read data before the detection section detects detachment and attachment of the component or unit and the read data after the detection section detects detachment and attachment of the component or unit, the both read data being stored in the storage section.

The output section outputs a determination result of the determination section.

In the above-described configuration, it is determined whether or not the quality of the image, which is formed on the sheet after detaching and attaching the component or unit, has been improved by use of the read data of an image, which is formed on a sheet before detaching and attaching a component or a unit of the image forming apparatus and the read data of an image, which is formed on a sheet after detaching and attaching the component or unit. That is, the image forming apparatus automatically determines the appropriateness of a detaching and attaching work with respect to a component or a unit.

BRIEF DESCRIPTION OF THE DRAWINGS

FIG. 5 is an explanatory view showing a specific example of the image quality improvement determination processing of the image forming apparatus according to the embodiment of the present invention.

DESCRIPTION OF THE PREFERRED EMBODIMENTS

Figure 1:
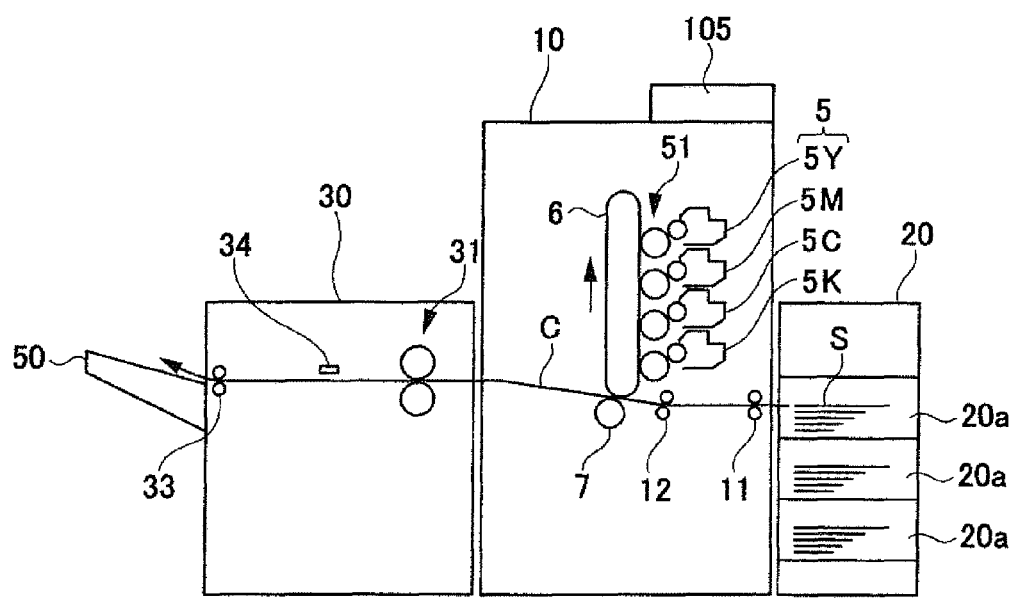
FIG. 1 is a whole configuration view of an image forming system including an image forming apparatus according to an embodiment of the present invention.

Hereinafter, an exemplary embodiment of the present invention will be described with reference to the accompanying drawings. The same reference numeral is attached to a constituent element common in each view so as to omit the duplicated description.

[Example of Whole Configuration of Image Forming System]

FIG. 1 is a whole configuration view of an image forming system including an image forming apparatus according to an embodiment of the present invention. Note that, FIG. 1 illustrates mainly portions, in the configuration of the image forming system, believed to be necessary for description of the present invention.

As illustrated in FIG. 1, an image forming system 1 includes an image forming apparatus 10, a sheet feeding apparatus 20, and a fixing apparatus 30.

In the sheet feeding apparatus 20, a plurality of sheet accommodation sections 20a is provided in accordance with the size or type of a sheet. In the sheet feeding apparatus 20, in accordance with an instruction from the image forming apparatus 10, a corresponding sheet accommodation section 20a is selected and a sheet S is taken out by a non-illustrated sheet feeding section and fed to a conveying path C of the image forming apparatus 10.

The image forming apparatus 10 adopts an electrophotographic system that forms an image using static electricity, and is a tandem-type color image forming apparatus that superimposes four color toner images, e.g., a toner image of yellow (Y), a toner image of magenta (M), a toner image of cyan (C), and a toner image of black (K). The image forming apparatus 10 includes an operation display section 105, an image forming section 5, an intermediate transfer belt 6 (image carrier), and a secondary transfer section 7.

The image forming section 5 includes four image forming units 5Y, 5M, 5C, and 5K in order to form a toner image of yellow, a toner image of magenta, a toner image of cyan, and a toner image of black. Moreover, the image forming apparatus 10 includes a plurality of rollers (conveying rollers) 11 and 12 for conveying sheets. The rollers 11 and 12 usually include a pair of rollers. Each roller described later also has the same configuration. Moreover, a conveying belt (illustration is omitted) for conveying the sheet S on which the toner images have been transferred but not yet fixed is disposed on the downstream side of the secondary transfer section 7 in the sheet conveying direction. The operation display section 105 has a function as an operation section configured to instruct to start a job, for example such as image forming processing.

In an image forming mode, the image forming apparatus 10 charges a photoreceptor 51, which the image forming units 5Y, 5M, 5C, and 5K each have, and eliminates electric charges in accordance with a document image to expose the photoreceptor 51, thereby forming an electrostatic latent image on the photoreceptor 51. Then, by use of a development section, the toner is attached to the electrostatic latent image of each of the yellow, magenta, cyan, and black photoreceptors 51 to form a toner image of each color. Next, the toner images formed in the yellow, magenta, cyan, and black photoreceptors 51 are sequentially primarily transferred onto the surface of the intermediate transfer belt 6 that rotates in the arrow direction.

Next, by use of the secondary transfer section 7 (secondary transfer roller), the toner image of each color primarily transferred onto the intermediate transfer belt 6 is secondarily transferred to the sheet S, which is supplied from the sheet feeding apparatus 20 and conveyed by the rollers 11 and 12. The toner image of each color on the intermediate transfer belt 6 is secondarily transferred to the sheet S so as to form a color image. The image forming apparatus 10 conveys the sheet S with the color toner image formed thereon, by means of a non-illustrated conveying belt and ejects the same to the fixing apparatus 30.

The fixing apparatus 30 performs fixing processing on the sheet S with the color toner image formed thereon that is supplied from the image forming apparatus 10. The fixing apparatus 30 includes, for example, a fixing section 31, a non-illustrated conveying belt near a carrying-in port, and a roller 33 near an ejection port. Note that the conveying belt in the image forming apparatus 10 and the conveying belt in the fixing apparatus 30 may be integrated.

The fixing section 31 provided in the fixing apparatus 30 pressurizes and heats the conveyed sheet S to fix the transferred toner image to the sheet S. The fixing section 31 includes, for example, a fixing upper roller and a fixing lower roller, i.e., a pair of fixing members. The fixing upper roller and the fixing lower roller are disposed in a state of being pressed against each other, and a fixing nip section is formed as a press contact section between the fixing upper roller and the fixing lower roller.

A heating section is provided inside the fixing upper roller. The roller section in an outer periphery of the fixing upper roller is warmed by radiation heat from the heating section. Then, the toner image on the sheet is heat-fixed by the heat transferred from the roller section of the fixing upper roller to the sheet.

The sheet S is conveyed so that the surface thereof (surface to be subjected to fixing), onto which the toner image is transferred by the secondary transfer section 7, faces the fixing upper roller, and passes the fixing nip section. Accordingly, the sheet S passing the fixing nip section is pressurized by the fixing upper roller and the fixing lower roller and heated by the heat of the roller section of the fixing upper roller. The sheet S subjected to the fixing processing by the fixing section 31 is ejected to a document receiving tray 50 by the roller 33.

The read sensor 34 is disposed on the downstream side of the fixing section 31 in the sheet conveying direction. The read sensor 34 reads the toner image of each color or a color toner image fixed to the sheet S, and outputs the read data to, for example, HDD 104 described later.

For the read sensor 34, a line sensor with a light-emitting member and a plurality of photoelectric conversion elements linearly arranged partially or entirely in the sheet width direction or an image sensor with photoelectric conversion elements arranged in a matrix is used, for example. As the line sensor and the image sensor, a CCD type image sensor or a CMOS type (including MOS type) image sensor can be used.

[Configuration of Control System of Image Forming Apparatus]

Next, a control system of the image forming apparatus 10 which the image forming system 1 includes is described.

Figure 2:
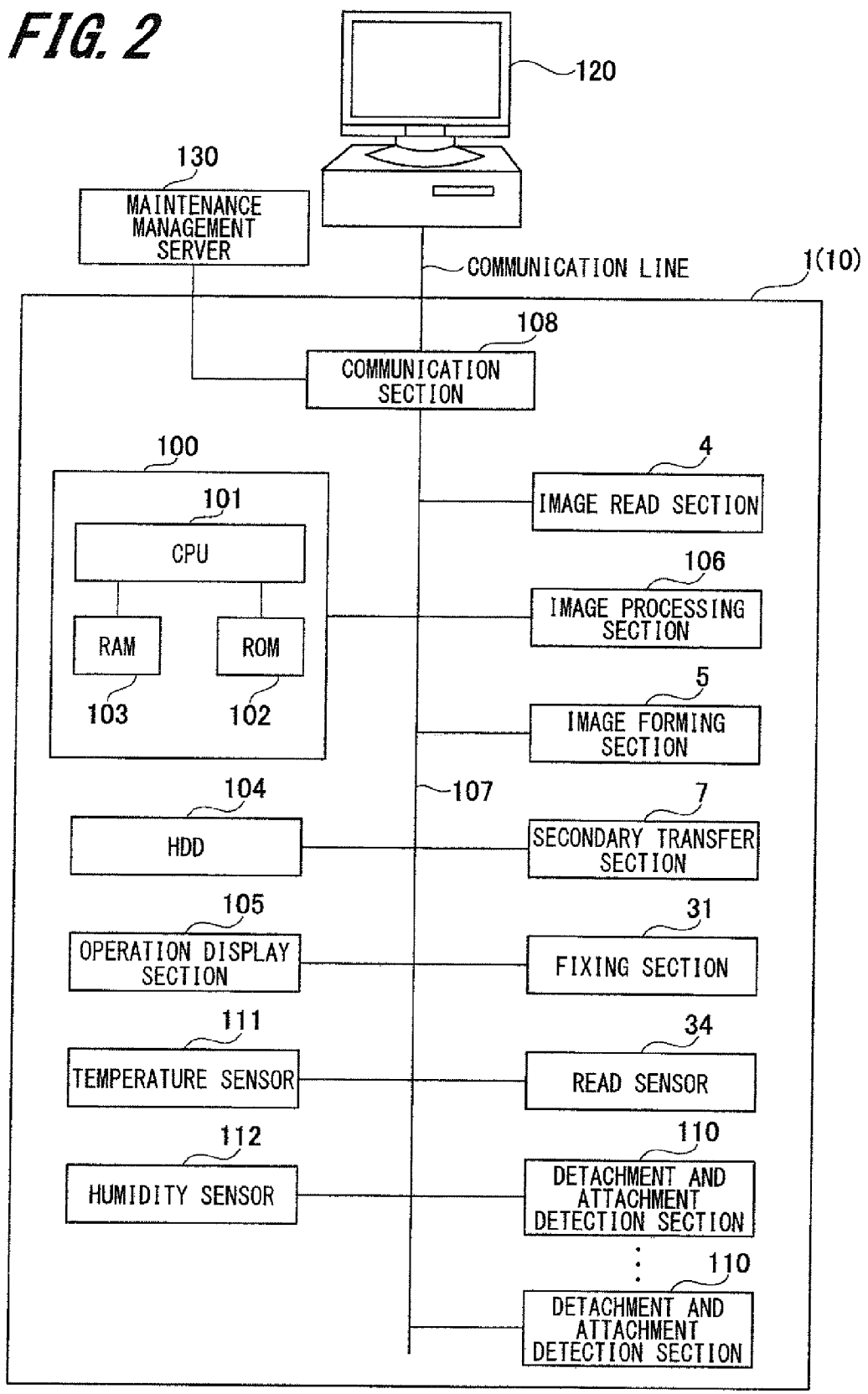
FIG. 2 is a block diagram showing the hardware configuration of each section of the image forming apparatus according to the embodiment of the present invention.

FIG. 2 is a block diagram showing the hardware configuration of each section of the image forming apparatus 10.

As illustrated in FIG. 2, the image forming apparatus 10 includes a control section 100. The control section 100 includes, for example, a CPU (Central Processing Unit) 101, a ROM (Read Only Memory) 102 for storing programs which CPU 101 executes, data, and the like, and a RAM (Random Access Memory) 103 used as a work area of CPU 101. ROM 102 has, for example, control programs for various kinds of jobs, data of setting values used in ripple noise removal processing, and the like stored therein. Note that, as ROM 102, an electrically erasable programmable ROM is used, for example. The control section 100 controls the respective blocks, i.e., controls the whole apparatus.

The control section 100 is coupled to HDD (Hard disk drive) 104 and the operation display section 105 via a system bus 107, respectively. Moreover, the control section 100 is connected to the image read section 4, an image processing section 106, the image forming section 5, the secondary transfer section 7, and the fixing section 31 of the fixing apparatus 30 via the system bus 107, respectively. Furthermore, the control section 100 is connected to the read sensor 34, a plurality of detachment and attachment detection sections 110, a temperature sensor 111, and a humidity sensor 112 via the system bus 107, respectively.

HDD 104 is a large capacity storage device that stores the image data of a document image read and obtained by the image read section 4 and stores the output image data and the like. The operation display section 105 is a touch panel including a display (an example of the output section), such as a liquid crystal display (LCD) or an organic ELD (Electro Luminescence Display), and a touch sensor (an example of the operation section). The operation display section 105 displays an instruction menu for a user, information related to the obtained image data, and the like. Furthermore, the operation display section 105 includes a plurality of keys whereby receives input of various kinds of instructions done by a user's key operation and data, such as texts and numbers, and generates an input signal and outputs the same to the control section 100.

The image data generated by the image read section 4 or the image data transmitted from PC (personal computer) 120, which is an example of the external device connected to the image forming apparatus 10, is sent to the image processing section 106 and subjected to image processing. The image processing section 106 performs analog processing, A/D conversion, shading correction, image compression, and the like on the received image data. The image forming section 5 forms an image based on the image data image-processed by the image processing section 106 or the image data read from HDD 104.

The communication section 108 (an example of the output section) receives, via a communication line, job information transmitted from PC 120 that is an external information processing apparatus. Then, the received job information is sent to the control section 100 via the system bus 107. Moreover, the communication section 108 communicates with an external server via a non-illustrated network. The communication section 108 communicates with, for example, a maintenance management server 130, as the external server, which stores the information on detachment and attachment of a component or a unit constituting the image forming system 1 (image forming apparatus 10) and an image quality improvement determination result corresponding to the information on the detachment and attachment.

In accordance with the job information, the control section 100 drives the image forming section 5 and the secondary transfer section 7 and controls the fixing processing of the fixing section 31 disposed in the fixing apparatus 30.

Under control of the control section 100, the read sensor 34 causes a light emitting member to light at a predetermined reference light emitting setting value, receives reflected light from the sheet S with the toner image fixed thereto, and outputs a detection value (read data) based on an amount of received light to the control section 100. The control section 100 determines, based on the read data output from the read sensor 34, whether or not the quality of an image (hereinafter, may be referred to as "image quality") has been improved before and after replacement or repair of a component or a unit in the image forming system 1 (image forming apparatus 10). Criteria (threshold value and the like) to determine whether or not the image quality has been improved are stored in ROM 102 or HDD 104 in advance. Note that the read data of the read sensor 34 is used also for adjustment of image forming conditions.

The detachment and attachment detection section 110 detects that a component or a unit has been detached and attached, and is provided for each component or unit. For example, a sensor is provided in the main body of the image forming apparatus 10 whereby detachment and attachment of a component or a unit are physically (mechanically) detected. Examples of this type of sensor include a photosensor and a mechanical sensor. Alternatively, in an IC (Integrated Circuit) chip incorporated into a component or a unit, the type and count information of the components or units are stored and the information is transmitted to or received from the main body of the image forming apparatus 10 in a contact or non-contact manner, so that the control section 100 automatically detects detachment and attachment. With the detection section, by communicating the information incorporated into the IC chip, it is possible to detect replacement or repair of a component or a unit in addition to the detachment and attachment thereof.

The temperature sensor 111 measures the temperature inside the image forming apparatus 10, and outputs the measurement result to the control section 100. The humidity sensor 112 measures the humidity inside the image forming apparatus 10, and outputs the measurement result to the control section 100.

Note that, in the present embodiment, an example has been described, in which the personal computer 120 is applied as the external apparatus, but not limited thereto. Various other types of apparatuses, for example such as a facsimile apparatus, can be applied as the external apparatus.

[Image Quality Improvement Determination Function of Control Section 100]

Next, an image quality improvement determination function of the control section 100 of the image forming apparatus 10 is described.

Figure 3:
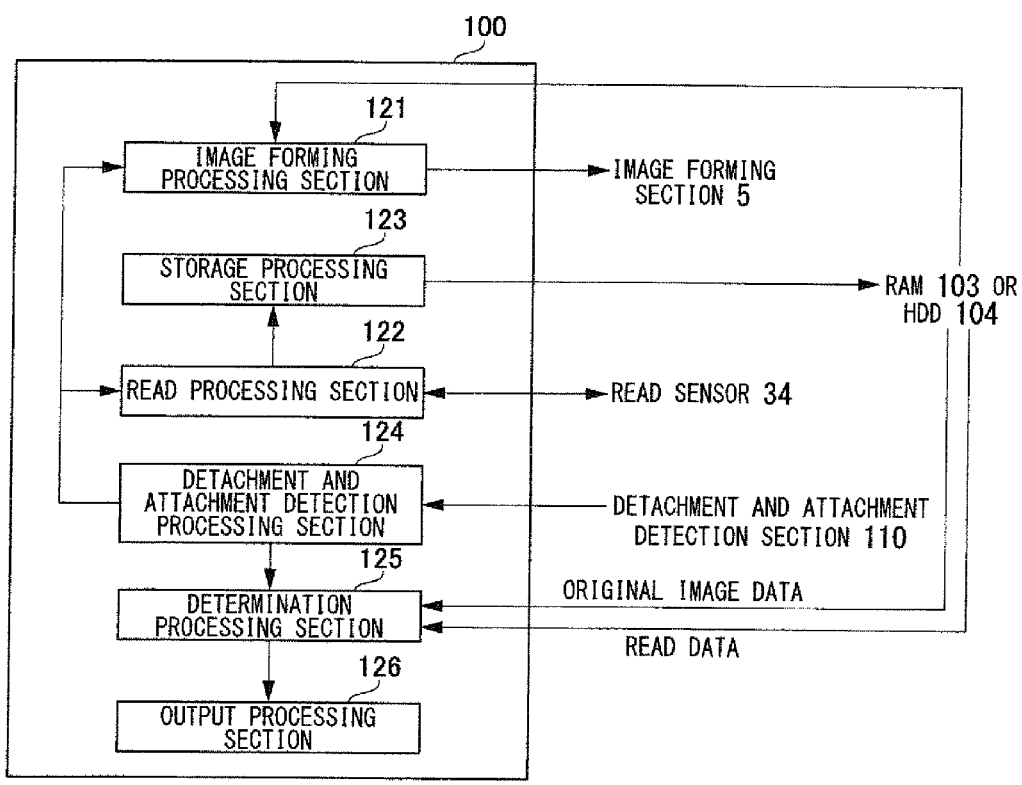
FIG. 3 is a block diagram showing an image quality improvement determination function of a control section of the image forming apparatus according to the embodiment of the present invention.

FIG. 3 is a block diagram showing the image quality improvement determination function of the control section 100 of the image forming apparatus 10. As illustrated in FIG. 3, the control section 100 includes an image forming processing section 121, a read processing section 122, a storage processing section 123, a detachment and attachment detection processing section 124, a determination processing section 125, and an output processing section 126.

The image forming processing section 121 controls the image forming processing based on the specified image data in the image forming section 5 (see FIG. 1, FIG. 2).

The read processing section 122 controls the read processing of the read sensor 34 (see FIG. 1, FIG. 2). The read processing section 122 constantly performs the read processing of an image formed on the sheet S and sends the data of read image (read data) to the storage processing section 123.

The storage processing section 123 performs the processing for storing read data, which is obtained by the read processing of the read processing section 122, and original image data of the image subjected to the read processing into RAM 103 or HDD 104 as an example of the storage section. Hereinafter, RAM 103 or HDD 104 is referred to as the "storage section." A specified number of sheets of read data and original image data are constantly stored in the storage section. Upon formation of a new image, the old read data and original image data stored in the storage section are updated accordingly.

The detachment and attachment detection processing section 124 controls the detachment and attachment detection processing of a component or a unit performed by the detachment and attachment detection section 110. Upon detection of the detachment and attachment, the detachment and attachment detection processing section 124 notifies the image forming processing section 121 and the read processing section 122 of the detection result.

The determination processing section 125 (an example of the determination section) determines whether or not the quality of an image, which is formed on a sheet after detachment and attachment, has been improved, using read data of an image, which is formed on the sheet before the detachment and attachment detection section 110 detects detachment and attachment of a component or a unit, and read data of the image, which is formed on the sheet after the detachment and attachment detection section 110 detects detachment and attachment of the component or unit, the both read data being stored in the storage section.

The output processing section 126 (an example of the output section) controls the processing for displaying the determination result of the determination processing section 125 on the operation display section 105 and the processing for transmitting the determination result to the maintenance management server 130 through the communication section 108.

[Image Quality Improvement Determination Processing]

Figure 4:
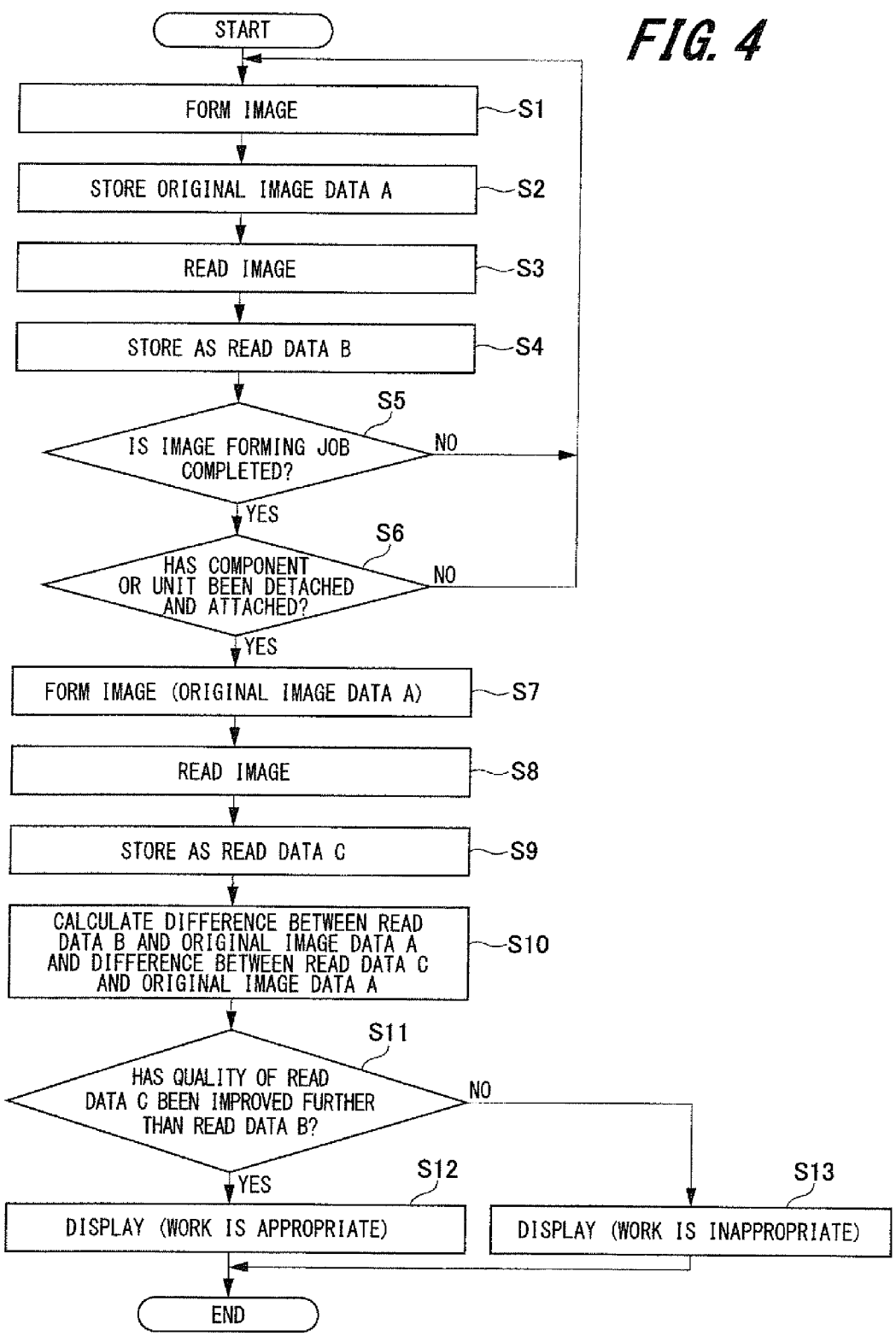
FIG. 4 is a flow chart showing image quality improvement determination processing performed by the control section of the image forming apparatus according to the embodiment of the present invention.

FIG. 4 is the flow chart showing an example of the image quality improvement determination processing performed by the control section 100 of the image forming apparatus 10.

First, the control section 100 of the image forming apparatus 10 detects the start of an image forming job, in accordance with an operation signal input from the operation display section 105 or the job information input via the communication section 108. Upon detection of the start of the image forming job, the control section 100 starts the image forming processing.

Upon start of the image forming job, the image forming processing section 121 of the control section 100 controls the image forming section 5 to perform the image forming processing based on the specified image data (Step S1). At this time, the storage processing section 123 stores the image data (referred to as "original image data A"), with which an image is formed, into the storage section (Step S2).

Next, the read processing section 122 of the control section 100 controls the read sensor 34 to perform the read processing of an image fixed to a sheet (Step S3). The storage processing section 123 stores the data (referred to as "read data B"), which is read by the read sensor 34, into the storage section (Step S4).

Here, the control section 100 determines whether or not the image forming job is complete (Step S5). When the image forming job is not complete ("NO" in Step S5), the control section 100 repeats the processing of Steps S1 to S5.

On the other hand, when the image forming job is complete ("YES" in Step S5), the detachment and attachment detection processing section 124 determines, from the detection result of the detachment and attachment detection section 110, whether or not the detachment and attachment of a component or a unit has been performed (Step S6). The detachment and attachment include replacing a component or a unit, and detaching and repairing a component or a unit and then attaching the same again. When the detachment and attachment of a component or a unit have not been performed yet ("NO" in Step S6), the control section 100 repeats the processing of Steps S1 to S6.

On the other hand, when the detachment and attachment of a component or a unit have been performed ("YES" in Step S6), the detachment and attachment detection processing section 124 notifies the image forming processing section 121 and the read processing section 122 that the detachment and attachment have been detected. Then, the image forming processing section 121 of the control section 100 controls the image forming section 5 to perform the image forming processing based on the specified image data, e.g., the original image data A, (Step S7).

Next, the read processing section 122 of the control section 100 controls the read sensor 34 to perform the read processing of the image fixed to the sheet (Step S8). The storage processing section 123 stores the data (referred to as "read data C") read by the read sensor 34 into the storage section (Step S9).

Next, the determination processing section 125 of the control section 100 calculates a difference between the read data B before detaching and attaching a component or a unit and the corresponding original image data A and a difference between the read data C after detaching and attaching the component or unit and the corresponding original image data A (Step S10).

Then, the determination processing section 125 compares the difference before detachment and attachment with the difference after detachment and attachment to determine whether or not the difference after detachment and attachment is smaller than the difference before detachment and attachment, i.e., whether or not the quality of the image corresponding to the read data C after detachment and attachment has been improved further than the quality of the image corresponding to the read data B before detachment and attachment, (Step S11).

Here, specific examples of the method for determining whether or not the image quality has been improved may include a method for calculating a difference in brightness data of a corresponding area between the original image data and the read data. This processing is performed on a plurality of pieces of original image data and a plurality of pieces of read data, and a total of differences between the plurality of pieces of original image data and the plurality of pieces of read data is calculated. If the difference between the original image data and the read data decreases before and after detachment and attachment, it is determined that the image quality has been improved. The more the quantity of the original image data and the read data to sum up, the more accurate determination can be performed. Moreover, the calculation of the difference in brightness data of a corresponding area between the original image data and the read data may be performed on the whole area of the read data (all of the pixels of the read sensor 34). Alternatively, with regard to a predetermined area of the original image data (predetermined pixels of the read sensor 34), the difference in brightness data of a corresponding area between the original image data and the read data may be calculated. For example, an area having a large number of pieces of brightness data of intermediate gradation in a digital image may be set to the predetermined area.

When the image quality of the read data C after detachment and attachment has been improved further than the image quality of the read data B before detachment and attachment ("YES" in Step S11), the output processing section 126 displays, on the operation display section 105, a message indicating that the work is appropriate (Step S12).

On the other hand, when the image quality of the read data C after detachment and attachment has not been improved as compared with the read data B before detachment and attachment ("NO" in Step S11), the output processing section 126 displays, on the operation display section 105, a message indicating that the work is inappropriate (Step S13). After the processing of Step S12 or Step 13 is complete, the control section 100 terminates a series of image quality improvement determination processing.

FIG. 5 is an explanatory view illustrating a specific example of the image quality improvement determination processing of the image forming apparatus 10.

First, the image forming apparatus 10 forms an image based on original image data(N) stored in the storage section, during execution of the image forming job. N is a natural number. In the example of FIG. 5, N=5 and an image is formed based on original image data (5) to (1) corresponding to five sheets of image (this corresponds to Steps S1 to S2). Note that the newer the image formation order of the original image data, the smaller the number in the parenthesis is.

Next, the image forming apparatus 10 sequentially reads the original image data (5) to (1) by means of the read sensor 34 to obtain read data (5) to (1) (this corresponds to Steps S3 to S5). Here, original image data (2) and (1) corresponding to two sheets of image and read data (2) and (1) are stored into the storage section.

Next, the image forming apparatus 10, upon detachment and attachment of a component or a unit (this corresponds to Step S6), executes a confirmation job for confirming an improvement in image quality, and forms an image based on the original image data stored in the storage section (this corresponds to Step S7). Here, an image for confirmation is formed on a sheet using original image data (1) and (2) corresponding to two sheets of image, and the read sensor 34 reads the image for confirmation to obtain read data [1] and [2] (this corresponds to Steps S8 to S9).

Then, the image forming apparatus 10 compares a difference between the read data [2] after detachment and attachment and the original image data (2) with a difference between the read data (2) before detachment and attachment and the original image data (2). Similarly, the image forming apparatus 10 compares a difference between the read data [1] after detachment and attachment and the original image data (1) with a difference between the read data [1] before detachment and attachment and the original image data (1). The image forming apparatus 10 confirms, based on the comparison result of these differences, whether or not the difference after detachment and attachment is smaller than the difference before detachment and attachment, i.e., whether or not the image quality has been improved before and after detaching and attaching a component or a unit (Steps S10 to S13).

After confirming that the image quality has been improved, the image forming apparatus 10 forms an image based on the original image data (N), (N−1), . . . if the image forming job is input, and constantly stores original image data corresponding to two sheets of image and read data into the storage section.

If an improvement in image quality has not been recognized, a repair person or a user performs an appropriate measure, such as replacing or repairing of another component or unit.

According to the above-described embodiment, the image forming apparatus 10, when a component or a unit is detached and attached, automatically confirms its effect (whether or not the image quality has been improved) to determine appropriateness of the work. Then, the result is output to the operation display section 105 and the like, so that wasteful replacement or repair of a component or a unit by a repair person or a user can be prevented. Moreover, the prevention of wasteful replacement or repair of a component or a unit allows the component cost to be reduced.

Moreover, when detaching and attaching (replacing or repairing) a component or a unit is input to the image forming apparatus 10 via the operation display section 105 or the communication section 108 in advance, an image based on the image data for confirmation of image quality improvement stored in the storage section may be formed before detachment and attachment and after detachment and attachment, respectively. In this case, the image data for confirmation held in the storage section is output in accordance with an instruction via the operation display section 105 or the communication section 108, and therefore the flow can promptly transition to the processing for confirming an improvement in image quality before detachment and attachment and after detachment and attachment.

Moreover, in the configuration, in which a difference between the read data before detachment and attachment of a component or a unit and the corresponding original image data is compared with a difference between the read data after detachment and attachment of the component or unit and the corresponding original image data, as in the above-described embodiment, the original image data used for confirmation of an improvement in image quality may be different. In this case, there is no need to prepare a special image for confirming an improvement in image quality, as the original image data, and therefore before detachment and attachment and after detachment and attachment any image can be used as the original image data.

Moreover, as in the above-described embodiment, when an image is formed after detachment and attachment of a component or a unit, a specific symbol, text, or the like may be added to the image so as to be able to identify the image for confirming that the image quality has been improved. Alternatively, a sheet, on which an image for confirmation is formed, is ejected to an eject destination different from the document receiving tray 50 which is the normal eject destination, so that a repair person or a user may be able to easily identify the sheet, on which the image for confirming an improvement in image quality is formed.

Moreover, in order for a repair person or a user to surely confirm the effect of replacement or repair, the control section 100 may, after detaching and attaching a component or a unit, control not to accept the image formation of another job or control to stop the operation until it completes the formation of the image for confirmation.

Moreover, the output processing section 126 may notify a user of prohibiting the detachment and attachment of a plurality of components or units at a time. For example, in order to prevent the replacement of a plurality of types (or a plurality of colors) of components or units at a time, the control section 100 may issue a warning using the operation display section 105 or a non-illustrated speaker or may control to stop the operation of the image forming apparatus 10.

Moreover, a repair person or a user may be able to arbitrarily set the quantity (a specified number of sheets) of the read data and corresponding original image data stored into the storage section, through the operation display section 105 or the communication section 108. For example, when the quantity is increased, an improvement in image quality after detachment and attachment can be more accurately confirmed.

Note that, in the above-described embodiment, information on the detachment and attachment of a component or a unit and a corresponding determination result are stored into the maintenance management server 130. The information on the detachment and attachment of a component or a unit and the information on the corresponding determination result are stored, and are effectively utilized by feeding back the same to a repair person or a user. Thereby, the occurrences of the wasteful replacement or repair of the component or unit by the repair person or the user can be reduced. Moreover, in addition to the information on the detachment and attachment of a component or a unit and the image quality improvement determination result corresponding to the information on the detachment and attachment, the conditions of the image forming apparatus 10 and the environmental conditions are obtained and combined, so that more appropriate replacement or repair of the component or unit can be achieved by reflecting the conditions of the image forming apparatus and the environmental conditions. The examples of the conditions of the image forming apparatus 10 include the count information of the number of times of image formation, the size, thickness, and type of a sheet, the temperature and humidity inside the image forming apparatus 10, and the toner density.

[Modifications]

In the foregoing, the embodiment, to which the present invention made by the present inventor applies, has been described. However, the present invention is not limited by the description and drawings as a part of the disclosure of the present invention according to the above-described embodiment, but various kinds of modifications can be implemented without departing from the spirit and scope of the present invention as defined by the claims.

For example, in the above-described embodiment, a configuration has been illustrated, in which the determination processing section 125 calculates a difference between the read data B before detaching and attaching a component or a unit and the corresponding original image data A and a difference between the read data C after detaching and attaching the component or unit and the corresponding original image data A, and compares the difference before detachment and attachment with the difference after detachment and attachment, but not limited to this example. For example, the read data B before detachment and attachment of a component or a unit may be directly compared with the read data C after detachment and attachment, and if the difference between the respective corresponding areas is larger than a predetermined threshold value, it may be determined that the image quality has been improved. In this case, one and the same image data is used for the original image data of the read data B before detachment and attachment and the original image data of the read data C after detachment and attachment. Because directly comparing the read data before detachment and attachment with the read data after detachment and attachment simplifies the calculation, the processing load on the control section 100 can be reduced.

Moreover, in the above-described embodiment, an example has been described, in which four image forming units 5Y, 5M, 5C, and 5K are provided in the image forming section 5 to form a color image, but the present invention may be applied to an image forming apparatus including only one image forming section and forming a monochrome image.

Moreover, in the above-described embodiment, a configuration has been illustrated, in which an image fixed to a sheet is read using the read sensor 34 disposed on the downstream side of the fixing section 31 in the sheet conveying direction, but the read sensor 34 may be disposed on the upstream side of the fixing section 31 in the sheet conveying direction so as to read an image before being fixed.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus that forms an image on a sheet, comprising:
    an image forming section configured to form an image;
    a read sensor that reads the image formed on a sheet; a detection section configured to detect detachment and attachment of a component or a unit constituting the image forming apparatus;
    a storage section configured to store read data read by the read sensor before the detection section detects detachment and attachment of the component or unit, read data read by the read sensor after the detection section detects detachment and attachment of the component or unit, and original image data read by the read sensor that is used to generate read data for times before and after the detection section detects detachment and attachment of the component or unit;
    a determination section configured to determine whether or not quality of an image, which is formed on the sheet after detachment and attachment of the component or unit, has been improved, using the read data before the detection section detects detachment and attachment of the component or unit and the read data after the detection section detects detachment and attachment of the component or unit, the both read data being stored in the storage section; and
    an output section configured to output a determination result of the determination section,
    wherein the determination section compares a difference between the read data before detachment and attachment of the component or unit and the original image data of the read data with a difference between the read data after detachment and attachment of the component or unit and the original image data of the read data, and
    the determination section determines that quality of an image, which is formed on the sheet after detachment and attachment of the component or unit, has been improved, when the difference after detachment and attachment of the component or unit is smaller than the difference before detachment and attachment.

2. The image forming apparatus according to claim 1, further comprising an operation section configured to generate an operation signal to instruct to detach and attach the component or unit, in accordance with an operation of a user, wherein when the operation section generates an operation signal to instruct to detach and attach the component or unit, the image forming section forms an image based on image data for confirming an improvement in quality of an image, the image data being stored in the storage section in advance.

3. The image forming apparatus according to claim 1, wherein the image forming section forms an image which can identify that the image is for confirming an improvement in quality of the image, in forming an image for confirming an improvement in quality of an image after the detection section detects detachment and attachment of the component or the unit.

4. The image forming apparatus according to claim 1, wherein the output section outputs information on detachment and attachment of the detached and attached component or unit and the corresponding determination result to an external server that stores information on detachment and attachment of a component or a unit and a corresponding determination result.

5. The image forming apparatus according to claim 1, wherein it is possible to arbitrarily set a quantity of the read data before detachment and attachment of the component or unit, a quantity of the read data after detachment and attachment of the component or unit, and a quantity of the original image data corresponding thereto, the quantities being stored into the storage section.

6. The image forming apparatus according to claim 1, wherein, after the component or unit is detached and attached, image formation for a new job will not be performed until completion of reading an image for confirming an improvement in quality of an image.

7. The image forming apparatus according to claim 1, wherein the output section notifies a user of prohibiting detachment and attachment of a plurality of components or units at a time.

* * * * *